(12) United States Patent
Minakata

(10) Patent No.: US 7,474,444 B2
(45) Date of Patent: Jan. 6, 2009

(54) IMAGE-PROCESSING DEVICE CAPABLE OF PRINTING OBLIQUE LINES

(75) Inventor: Yoshinori Minakata, Osaka (JP)

(73) Assignee: Kyocera Mita Corporation, Osaka (JP)

( * ) Notice: Subject to any disclaimer, the term of this patent is extended or adjusted under 35 U.S.C. 154(b) by 579 days.

(21) Appl. No.: 11/296,377

(22) Filed: Dec. 8, 2005

(65) Prior Publication Data
US 2006/0140509 A1    Jun. 29, 2006

(30) Foreign Application Priority Data
Dec. 27, 2004   (JP)   ............... 2004-376008

(51) Int. Cl.
*G06K 15/00* (2006.01)
*G06T 5/00* (2006.01)
*H06N 1/407* (2006.01)
*G06F 15/00* (2006.01)

(52) U.S. Cl. ....................... 358/3.27; 358/1.2
(58) Field of Classification Search ................ 358/3.27, 358/1.1, 1.2, 2.1
See application file for complete search history.

(56) References Cited
U.S. PATENT DOCUMENTS
2007/0196029 A1 *  8/2007  Kondo et al.

FOREIGN PATENT DOCUMENTS
JP    10-149443    6/1998

* cited by examiner

*Primary Examiner*—Douglas Q Tran
(74) *Attorney, Agent, or Firm*—Westerman, Hattori, Daniels & Adrian, LLP.

(57) ABSTRACT

The present invention provides for an image-processing device capable of printing oblique lines with an angle of approximately 45 degrees and constant width at any time to obtain a printed image of superior quality. The line-work path information whose coordinate position has been specified by a path processing section (3) is passed to a path control section (4), which stores and controls the path information. When there is an oblique line in the path information to be printed, a 45-degree line determining section (5) judges whether or not the oblique line has an angle within a given range of approximately 45 degrees relative to a horizontal axis or a vertical axis, and once determined as such, the determining section (5) passes the path information to a 45-degree line approximating section (6). The 45-degree line approximating section (6) secures and fixes all the path information of oblique lines received to a 45-degree oblique line and thereafter passes it to a line-drawing processing section (7). In this manner, all oblique lines determined to have angles within the prescribed range of approximately 45 degrees relative to the horizontal axis or the vertical axis are drawn as 45-degree oblique lines.

2 Claims, 4 Drawing Sheets

F I G. 3
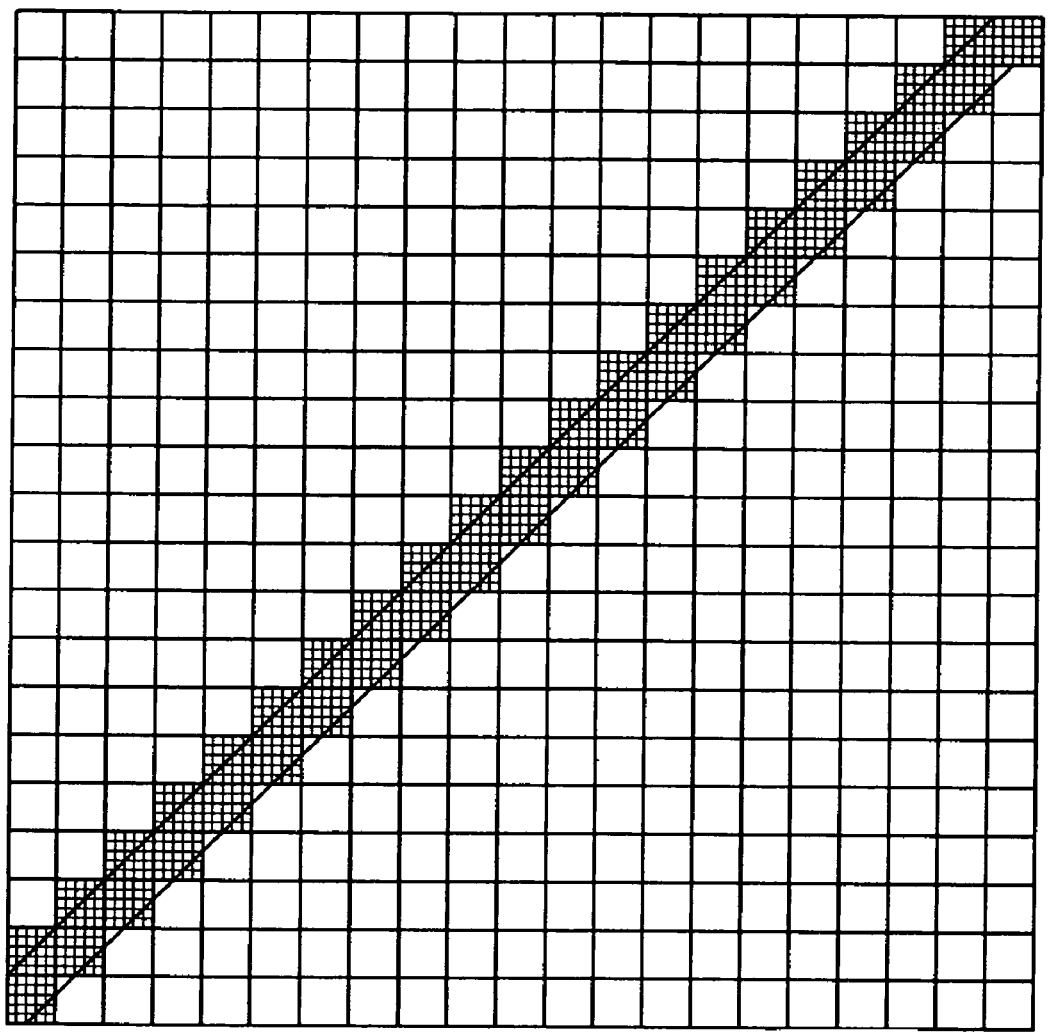

F I G. 4
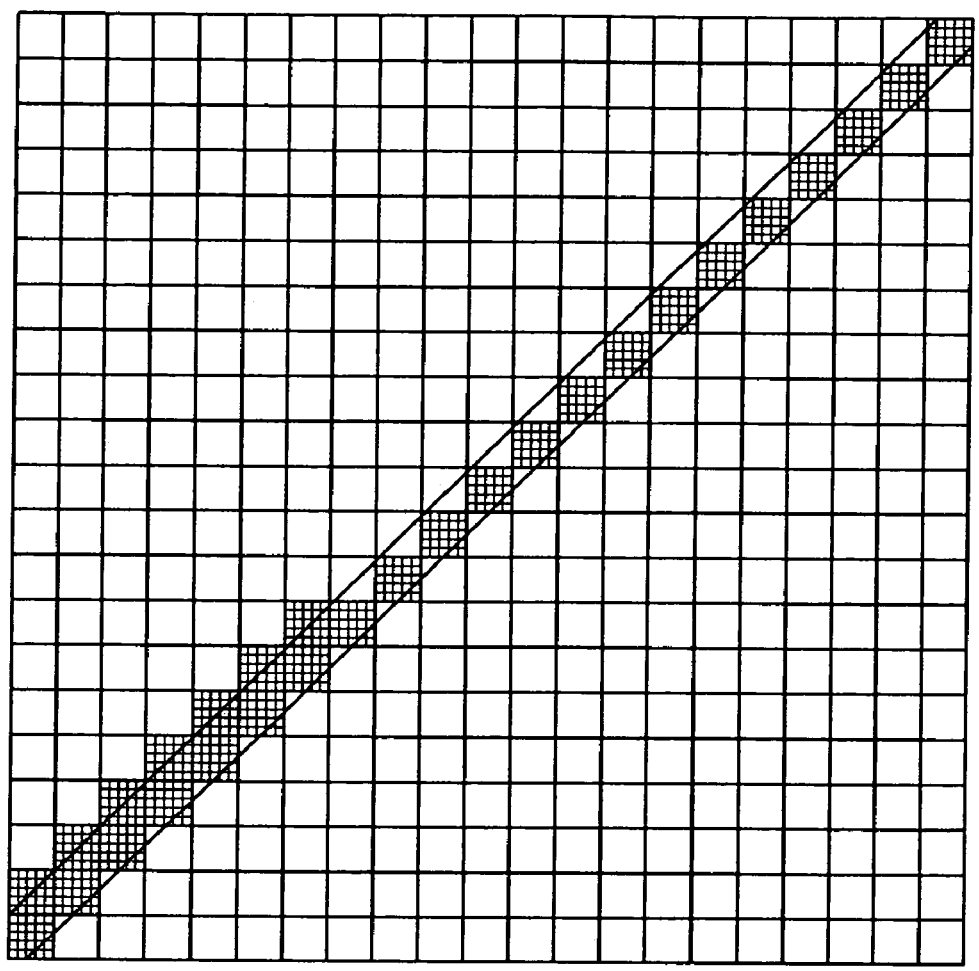

IMAGE-PROCESSING DEVICE CAPABLE OF PRINTING OBLIQUE LINES

BACKGROUND OF THE INVENTION

1. Field of the Invention

The present invention relates to an image-processing device such as a printer or a hybrid copier, which is used in drawing image data including straight lines having various angles such as CAD data.

2. Description of Related Art

A CAD system is capable of creating design drawings for machines and architectural structures or the like on a computer, then transmits created CAD data to an image-forming device such as a printer to be printed. In creating drawings on the computer, the user operates a mouse while viewing the drawing on the display screen of the computer. For example, if the user intends to draw a straight line, he points to or clicks a point of origin and an end point with the use of the mouse.

Then, to print an image that has been inputted in this manner, the computer converts the image into processible print data by means of the image-forming device and passes it to the image-forming device, which converts the print data received from the computer into bitmap data and the printing engine executes printing. On such an occasion, when the image of an oblique straight line is created, for example, the dots (pixels) of edge portions of the image are not equally represented to form a straight line image at a particular angle thereof, such that the image printed could be a line having uneven thickness at certain points.

To correct such a phenomenon, an image-forming method has been disclosed in Japanese Laid Open Patent Publication No. 10-149443 (see FIGS. 1 and 2), for example. The object of the image-forming method disclosed in the above-mentioned patent document is to provide a image-forming method for smoothing the shape of an oblique line having a tilt angle of 45 degrees and for easily determining changes in pixel processing. Then, sample windows are set up at predetermined regions of the original image, and edge data showing whether the four boundaries of each pixel is an edge in the sample windows is established, and by referring to the edge data, determination is made as to whether a given pixel is included in the 45-degree oblique line. The predetermined pixel then selects a pixel conversion pattern previously prescribed for a 45-degree oblique line or a pixel conversion pattern for an oblique line having a tilt angle other than 45 degrees and is converted to form an oblique line having a smooth shape.

However, while the image-forming method disclosed in the above-mentioned patent document was intended to form an oblique line having a smooth shape, it does not address the situation where an oblique line having an angle slightly 45 degrees off is formed, i.e., 44.5 degrees, due to unsteadiness of the user's hand while operating the mouse or a calculation error of floating point in the software or the like. Thus, if the oblique line had a 1-dot width, thick areas and narrow areas alternately appeared and its thickness became uneven in the longer direction.

To illustrate this point, reference to FIGS. 3 and 4 will be made. FIG. 3 is a drawing of a 45-degree oblique line, while FIG. 4 shows an oblique line having an angle slightly 45 degrees off. Line width is set to 1-dot width and the dots are designed to turn on when the center of a pixel is included in a path. The entire length is drawn with a uniform thickness when the angle of the oblique line is exactly 45 degrees as shown in FIG. 3. On the other hand, as shown in FIG. 4, when the angle is slightly 45 degrees off, the line width becomes 1-dot width after some time of being 2-dot width, and reverts to 1-dot width, alternately appearing in such manner for a relatively long period, and the unevenness of line width is noticeable as to reduce image quality.

Since a regular image-forming device is equipped with a smoothing function and smoothing is performed to achieve the drawing result shown in the above-mentioned patent document, the changes in dot width become less conspicuous to a certain extent. However, such function cannot correct the changes in line width for a predetermined period, while a problem also arises where the line printed is thicker by a certain amount than its intended line width as drawn, when dot interpolation occurs due to smoothing.

SUMMARY OF THE INVENTION

In view of such problems, the present invention has been created with the objective of enabling the printing of oblique lines having an angle close to 45 degrees to have a constant width at any time as well as of images with high picture quality.

Accordingly, an image-processing device according to Claim 1 has a 45-degree line determining means for judging whether line-work data comprises an oblique line having an angle within a certain range of approximately 45 degrees relative to either a horizontal axis or a vertical axis, and a 45-degree line approximating means for securing and fixing all line-work data which the 45-degree line determining means has adjudged to be an oblique line having an angle within the said given range, to the line-work data of 45-degree oblique lines and passing such data to the line-drawing processing means. Further, the image-processing device according to Claim 2 is the image-processing device according to Claim 1, and is provided with a drawing mode for fixing all oblique lines having angles within the range of approximately 45 degrees relative to either the horizontal axis or the vertical axis to 45 degrees, and a drawing mode for drawing the lines at original angles, wherein either of the two drawing modes can be selected.

BRIEF DESCRIPTION OF THE DRAWINGS

FIG. 3 is a drawing of a 45-degree oblique line.

FIG. 4 is a drawing of an oblique line whose angle is slightly 45 degrees off.

DETAILED DESCRIPTION OF THE PREFERRED EMBODIMENTS

Figure 1:
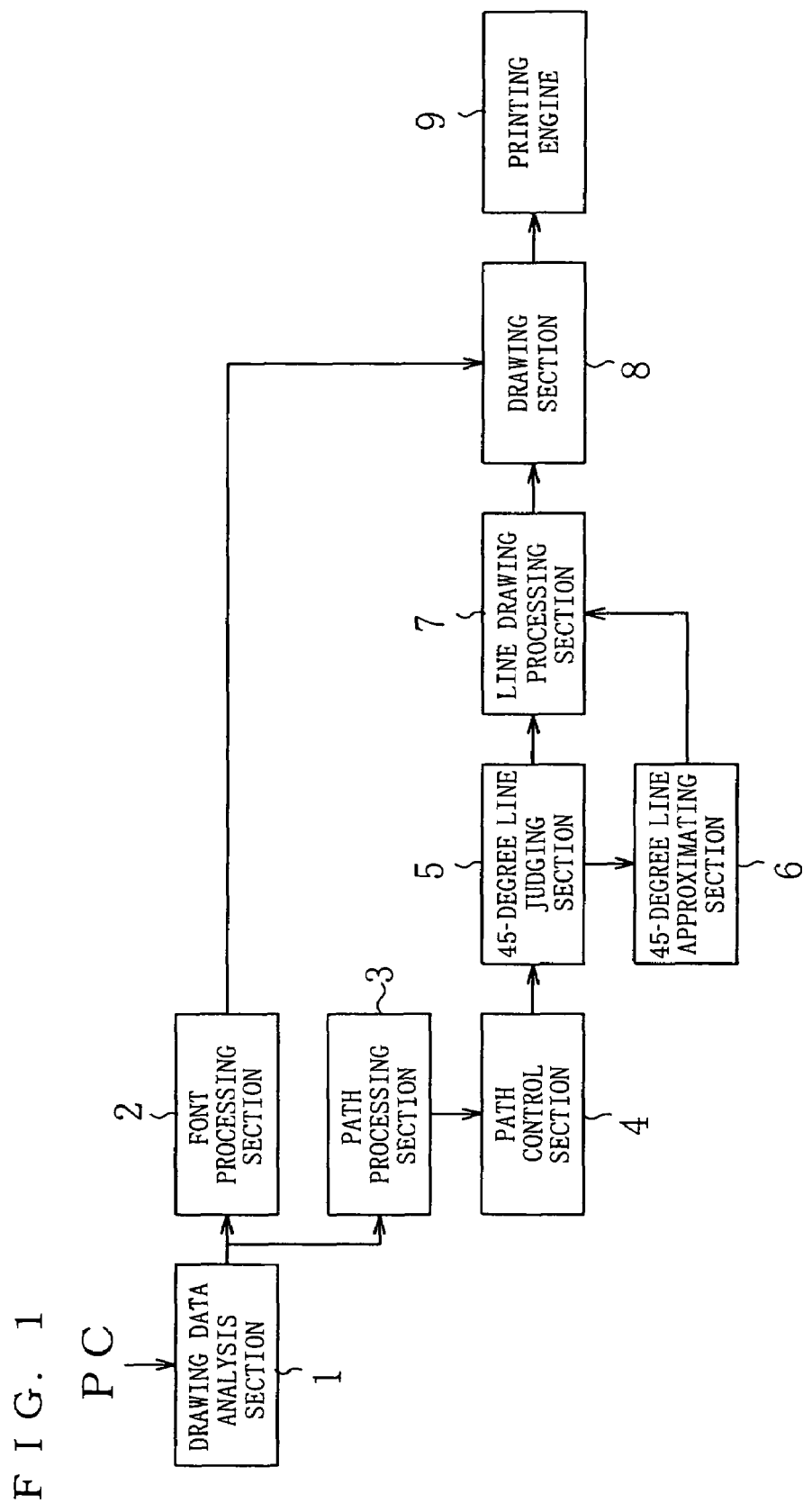
FIG. 1 is a block diagram of the image-processing device of the present invention.
Figure 2:
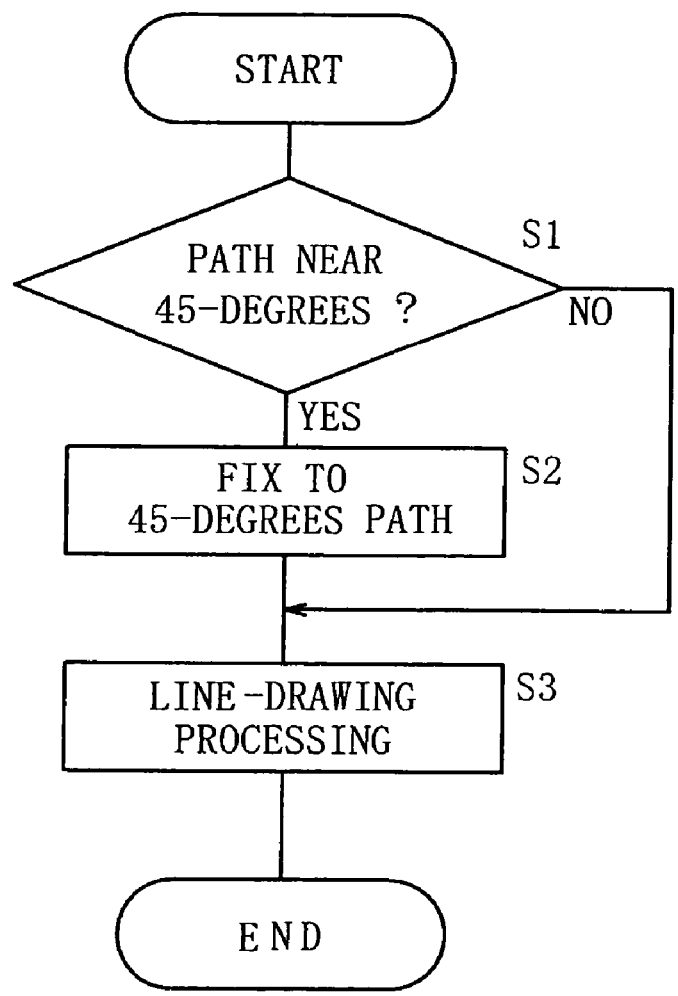
FIG. 2 is a flowchart showing the processing that takes place, in the image-processing device of the present invention.

Specific examples of the present invention will be described in detail by using embodiments and the drawings. FIG. 1 is a block diagram of an image-processing device of the present invention and FIG. 2 is a flowchart showing the processing that takes place in the image-processing device of the present invention. FIG. 3 is a drawing of a 45-degree oblique line while FIG. 4 is a drawing of an oblique line whose angle is slightly 45 degrees off.

First Embodiment

As shown in FIG. 1, an image data analysis section 1 analyzes drawing data received from a personal computer or the like, sends it to a font processing section 2 if the drawing data consists of letters or characters, or sends it to a path processing section 3 if the data consists of line-work data. After processing the font of the letters or characters comprising the drawing data, the font processing section 2 passes on the data to a drawing section 8. On the other hand, the path processing section 3 specifies the coordinate position of the line-work data for passing on to a path control section 4, which then stores and controls the path information received from the path processing section 3.

A 45-degree line determining section 5, a 45-degree line approximating section 6 and a line-drawing processing section 7 perform the processing functions shown in the flowchart of FIG. 2. When there is an oblique line in the path information to be printed, the 45-degree line determining section 5 judges whether the angle of the oblique line is close to 45 degrees with respect to a horizontal axis or a vertical axis, that is, an angle within a range of approximately 45 degrees, or which may range between 44.1 degrees and 45.9 degrees, for example. As a result, when the angle of the oblique line is within the prescribed range, the 45-degree line determining section 5 passes the path information to the 45-degree line approximating section 6, or passes it to the line-drawing processing section 7 when the angle is not within the given range (step S1).

The 45-degree line approximating section 6 fixes the path information of all oblique lines which have been received from the 45-degree line determining section 5, to the 45-degree oblique line, and passes the same to the line-drawing processing section 7 (step S2). The line-drawing processing section 7 executes line-drawing processing based on the path information received from the 45-degree line determining section 5 and the 45-degree line approximating section 6, and passes its processing results to the drawing section 8 (step S3).

Thereafter, the drawing section 8 develops drawing information received from the font processing section 2 and the line-drawing processing section 7 into bitmap data, and passes it to a printing engine 9 for printing.

In accordance with this method, all oblique lines having an angle close to 45 degrees are printed as oblique lines having exactly 45 degrees, so that they can be always appear to have a fixed width when printed as exemplified by the line shown in FIG. 3, and printing of images of high picture quality can be obtained.

Second Embodiment

In the above-described first embodiment, all oblique lines having an angle close to 45 degrees are printed as oblique lines having exactly 45 degrees. However, in creating drawings using CAD, such oblique lines cannot be drawn if the settings of the image-forming device relate to those of the first embodiment.

Therefore, the second embodiment provides for a mode for printing all oblique lines having an angle close to 45 degrees as oblique lines having exactly 45 degrees, and a mode for printing such oblique lines having an angle close to 45 degrees directly based on such angle even if image quality suffers a little to allow an operator to select either mode in printing. Thus, when it is necessary to print oblique lines having an angle close to 45 degrees directly based on such angle, the operator presses a mode selection button on an operation panel of the image-forming device to select the mode for printing directly based on the angle of the oblique line(s). On the other hand, when such printing is not required, the operator merely selects the mode for printing all the oblique lines as oblique lines having an angle of exactly 45 degrees.

Normally, following this method, the desired image to be printed would have a high picture quality, and printing based on the accurate angle therefore becomes possible when necessary.

The image-processing device of the present invention exerts the following effects.

Specifically, since the image-processing device according to Claim 1 is designed to draw lines by securing and fixing all the oblique lines having angles within the given range of approximately 45 degrees relative to the horizontal axis or the vertical axis to the 45-degree oblique line, it is possible to print an oblique line having an angle close to 45 degrees with a fixed width at any time and to obtain a printed image with high picture quality.

Further, since the image-processing device according to Claim 2 is provided with a mode for drawing all oblique lines having angles within the given range of approximately 45 degrees relative to the horizontal axis or the vertical axis by fixing the lines to 45 degrees, and a mode for drawing the lines directly at original angles, and any one of these two modes can be selected, image output of high picture quality and image output based on an accurate angle can be obtained.

What is claimed is:

1. An image-processing device, comprising:
   45-degree line determining means for judging whether line-work data comprises an oblique line having an angle within a given range of approximately 45 degrees relative to a horizontal axis or a vertical axis; and
   45-degree line approximating means for securing and fixing all line-work data which the 45-degree line determining means has adjudged to be an oblique line having an angle within the said prescribed range, to the line-work data of 45-degree oblique lines and passing such data to a line-drawing processing means.

2. The image-processing device according to claim 1, said device being provided with:
   a drawing mode for fixing all oblique lines having angles within the range of approximately 45 degrees relative to the horizontal axis or the vertical axis to 45 degrees; and
   a drawing mode for drawing the lines at original angles, wherein either of the two drawing modes can be selected.

* * * * *